Patented June 13, 1933

1,913,484

UNITED STATES PATENT OFFICE

JOSEF HALLER, OF LEVERKUSEN-WIESDORF, GERMANY, ASSIGNOR TO GENERAL ANILINE WORKS, INC., OF NEW YORK, N. Y., A CORPORATION OF DELAWARE

NEW HYDROXY-THIONAPHTHENE COMPOUNDS

No Drawing. Application filed May 1, 1931, Serial No. 534,453, and in Germany May 10, 1930.

The present invention relates to new hydroxythionaphthene compounds, more particularly it relates to compounds of the probable general formula:

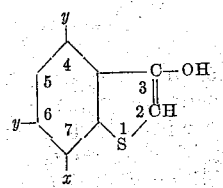

wherein $x$ stands for the carboxylic acid-, carboxylic acid-amide-, carboxylic acid-chloride- or the cyanogen group, and $y$ stands for hydrogen or a monovalent substituent, such as alkyl, alkoxy and halogen.

My new compounds of the above general formula, in which $x$ stands for a carboxylic acid-chloride group, are obtainable, for example, by starting with a phenyl-1-thioglycol-2-carboxylic acid with a free 6-position and which may be otherwise substituted in the phenyl nucleus, for example, by alkyl, alkoxy and halogen, transforming the same into the acid chloride in the usual manner, for example, by the action of phosphorus trichloride, and effecting the ring closure to form the corresponding 3-hydroxythionaphthene-7-carboxylic acid chloride by means of aluminium chloride in an inert organic solvent at moderate temperature, say up to 30° C., which process is more fully described in the annexed examples. The process may be represented by the following scheme:

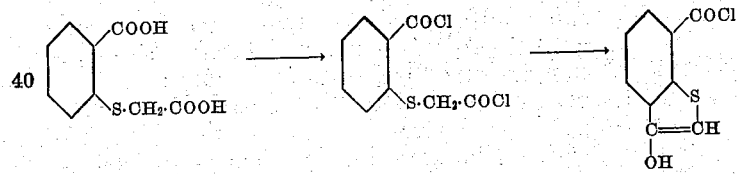

When causing chlorosulfonic acid to act upon a phenyl 1-thioglycol-2-carboxylic acid the corresponding 3-hydroxy-thionaphthene-7-carboxylic acid is obtained.

The hydroxythionaphthene compounds of the general formula referred to above in which $x$ stands for

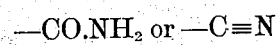

are obtainable in an analogous manner by starting with the corresponding 2-cyano-or 2-carboxyamino-phenyl-1-thioglycolic acids with a free 6-position and which may be otherwise substituted in the benzene nucleus by monovalent substituents, such as halogen, an alkyl and alkoxy group, and effecting the ring closure by treating with an acid condensing agent, such as aluminium chloride, ferric chloride and chlorosulfonic acid, at low temperatures, which is more fully described in the examples.

From the acid chlorides, acid amides or acid nitriles the free carboxylic acids are obtainable by hydrolyzing in aqueous solution in the usual manner.

My new thionaphthene compounds are generally colorless to faintly colored substances, scarcely soluble in water, soluble in alkalies and organic solvents, and are valuable intermediate products in the manufacture of dyestuffs.

The invention is illustrated by the following examples, without being limited thereto:

*Example 1.*—63 parts by weight of phenyl-1-thioglycol-2-carboxylic acid are heated on the water bath with 90 parts by weight of phosphorus trichloride in 200 parts by weight of dichlorobenzene while stirring, until the development of hydrochloric acid has ceased. After filtering, there are added to the filtrate 300 parts by weight of dichlorobenzene and at a temperature of 5 to 10° C. 45 parts by weight of aluminium chloride; while stirring, the temperature is gradually raised to aboue 25° C., and the mass is stirred until the development of hydrochloric acid has ceased, whereupon from the solution which is at first clear a yellow colored precipitate of the acid chloride separates. Then the mass is poured into ice water and the dichlorobenzene is distilled off by means of steam. The 3-hydroxy-thionaphthene-7-carboxylic acid thus obtained having the following formula:

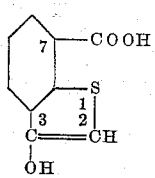

is filtered after cooling and washed with water containing hydrochloric acid. The crude product is a faintly pink colored powder, dissolving absolutely clear in cold soda solution. When exposed to air for a prolonged time, the solution becomes violet while forming the thioindigo-7.7'-dicarboxylic acid. The yield amounts to about 75% of the theoretical. The 3-hydroxythionaphthene-7-carboxylic acid dissolves in hot nitrobenzene and crystallizes in colorless sharply pointed crystals which at a temperature of 300° C. are not yet molten.

*Example 2.*—25 parts by weight of 5-chlorophenyl-1-thioglycol-2-carboxylic acid are transformed into the diacid chloride by treating with an excess of thionylchloride in 120 parts by weight of dichlorobenzene. The excess thionylchloride is removed, and 25 parts by weight of aluminium chloride are added to the solution at a temperature of about 15° C. By gradually raising the temperature to 35 to 40° C. the reaction is completed and the isolation of the 4-chloro-3-hydroxythionaphthene-7-carboxylic acid of the following formula:

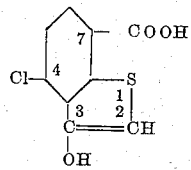

is performed in the same manner as described in Example 1. The product shows properties similar to those of the unchlorinated acid. By oxidation in alkaline solution, for example, with potassium ferricyanide, the 4.4'-dichlorothioindigo-7.7'-dicarboxylic acid is obtained, the sodium salt of which is soluble in water with a reddish violet coloration.

*Example 3.*—256 parts by weight of 4-ethoxy-2-phenylthioglycol-1-carboxylic acid are suspended in 800 parts by weight of o-dichlorobenzene and, after adding 300 parts by weight of phosphorus trichloride, heated on the water bath, until the development of hydrochloric acid has ceased. The solution of the diacid chloride is filtered off, and the filtrate is diluted with 1200 parts by weight of dichlorobenzene. After cooling to about 5° C., 150 parts by weight of aluminium chloride are gradually introduced while stirring, and a yellow colored precipitate separates after a short time, while hydrochloric acid evenly develops. Finally the reaction mass becomes pasty, and, by diluting with petroleum ether and sucking off the precipitate, the formed 4-ethoxy-3-hydroxythionaphthene-7-carboxylic acid chloride of the following formula:

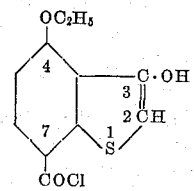

is obtained.

In order to produce the free carboxylic acid the reaction mixture is introduced in water, and the whole is distilled with steam, whereby the acid chloride is saponified. The 4-ethoxy-3-hydroxythionaphthene-7-carboxylic acid thus obtained is a faintly reddish colored powder, readily soluble in diluted soda solution; it may be recrystallized from nitrobenzene and shows properties similar to those of the 3-hydroxythionaphthene-7-carboxylic acids described above. When oxidizing in an alkaline medium, a violet-red solution of the 4.4'-diethoxy-thioindigo-7.7'-dicarboxylic acid is obtained.

*Example 4.*—25 parts by weight of 5-ethoxy-1-phenylthioglycol-2-carboxylic acid are introduced, while stirring, into 300 parts by weight of chlorosulfonic acid at a temperature of —8 to —2° C. After one hour's stirring at this temperature, the green colored solution is poured into ice water. The 4-ethoxy-3-hydroxythionaphthene-7-carboxylic acid thus obtained is sucked off, washed with water and dried. It is a faintly pink colored powder, dissolving in water containing soda, and is identical with the product described in Example 3.

*Example 5.*—24 parts by weight of 2-cyano-3-methyl-5-chlorophenyl-1-thioglycolic acid are introduced in 350 parts by weight of chlorosulfonic acid at a temperature of about —5° C. After four hours' stirring the solution is introduced into ice water at a temperature of —5 to 0° C., and the reaction product separates as a semi-solid mass, which after standing for a short time solidifies in crystals. The 4-chloro-6-methyl-7-cyano-3-hydroxythionaphthene thus obtained forms a nearly colorless powder, being easily soluble in organic solvents with the exception of benzine; in caustic soda lye it dissolves with a yellowish coloration. When heating this solution to boiling for a prolonged time, saponification of the cyano-group enters, while at the same time ammonia is split off. After acidifying, the 4-chloro-6-methyl-3-hydroxythionaphthene-7-carboxylic acid is obtained as a faintly reddish colored powder, which may be purified by dissolving in water containing soda and precipitating with hydrochloric acid; at a temperature of 300° C. the compound is not yet molten. The process may be represented by the following scheme:

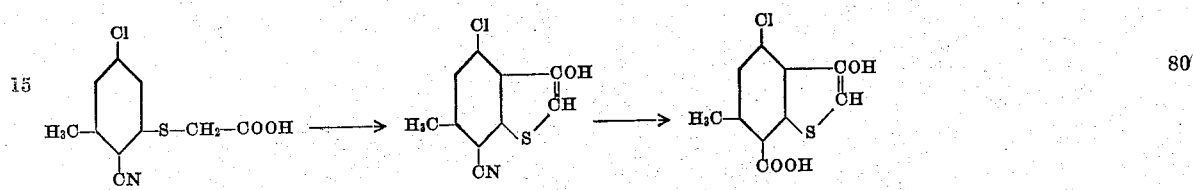

*Example 6.*—10 parts by weight of 2-cyano-5-methyl-phenyl-1-thioglycolic acid of the melting point 152° C. are added to about 210 parts by weight of chlorosulfonic acid at a temperature of about −20° C., and the mixture is kept at −17 to −18° C. for about 5 hours. The reaction mass is poured onto ice, and the 4-methyl-7-cyano-hydroxythionaphthene thus produced having the following formula:

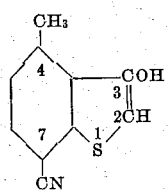

has the melting point of 194° C. On saponification with caustic soda solution, the compound is converted in the corresponding carboxylic acid, while at the same time ammonia is split off.

*Example 7.*—10 parts by weight of 2-amido-carboxy-5-ethoxyphenyl-1-thioglycolic acid are added to 220 parts by weight of chlorosulfonic acid at a temperature of −20° C. The mixture is kept for about 5 hours at −16 to −18° C. and on the addition of ice the 4-ethoxy-hydroxythionaphthene-7-carboxylic acid amide separates which may be converted into the corresponding carboxylic acid by saponification. The product corresponds to the following formula:

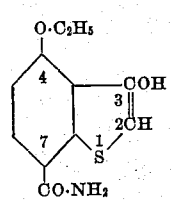

I claim:
1. As new substances hydroxy-thionaphthene compounds of the probable general formula:

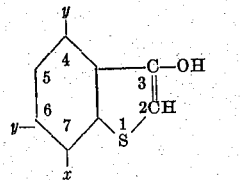

wherein $x$ stands for a substituent of the group consisting of carboxylic acid-, carboxylic acid amide-, carboxylic acid chloride and the cyanogen group, and $y$ stands for hydrogen or a monovalent substituent of the group consisting of methyl, ethoxy and chlorine, being generally colorless to faintly colored substances, scarcely soluble in water, generally soluble in organic solvents, and being valuable intermediate products for the manufacture of dyestuffs.

2. As a new product 3-hydroxy-thionaphthene-7-carboxylic acid chloride, being a yellow colored substance and being a valuable intermediate product for the manufacture of dyestuffs.

3. As a new product 4-methyl-7-cyano-3-hydroxy-thionaphthene, having a melting point of 194° C. and being a valuable intermediate product for the manufacture of dyestuffs.

4. As a new product 4-ethoxy-3-hydroxy-thionaphthene-7-carboxylic acid, being a faintly reddish colored substance, and being a valuable intermediate product for the manufacture of dyestuffs.

In testimony whereof, I affix my signature.

JOSEF HALLER.